Aug. 8, 1950　　　　　　H. GOLDBERG　　　　　2,518,136
CUTTER BAR FOR LAWN MOWERS AND THE LIKE
Filed Dec. 13, 1947　　　　　　　　　　　2 Sheets-Sheet 1
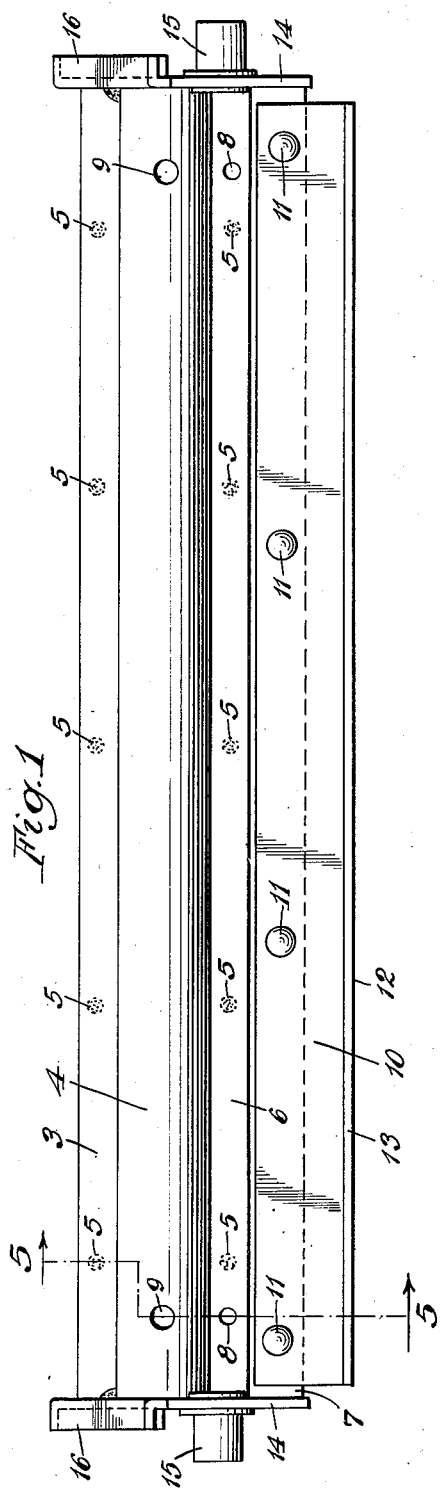
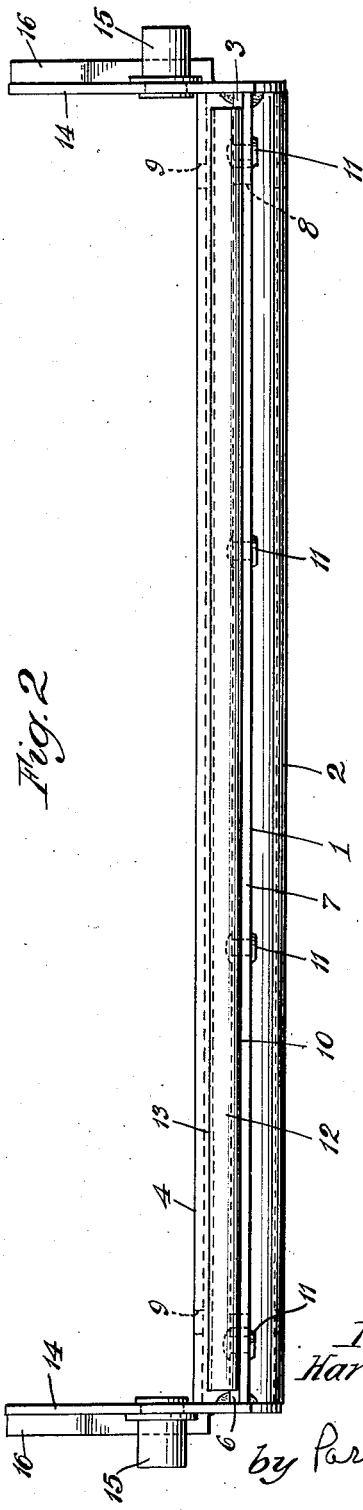
Inventor
Harry Goldberg
by Parker & Carter
Attorneys Aug. 8, 1950 H. GOLDBERG 2,518,136
CUTTER BAR FOR LAWN MOWERS AND THE LIKE
Filed Dec. 13, 1947 2 Sheets-Sheet 2
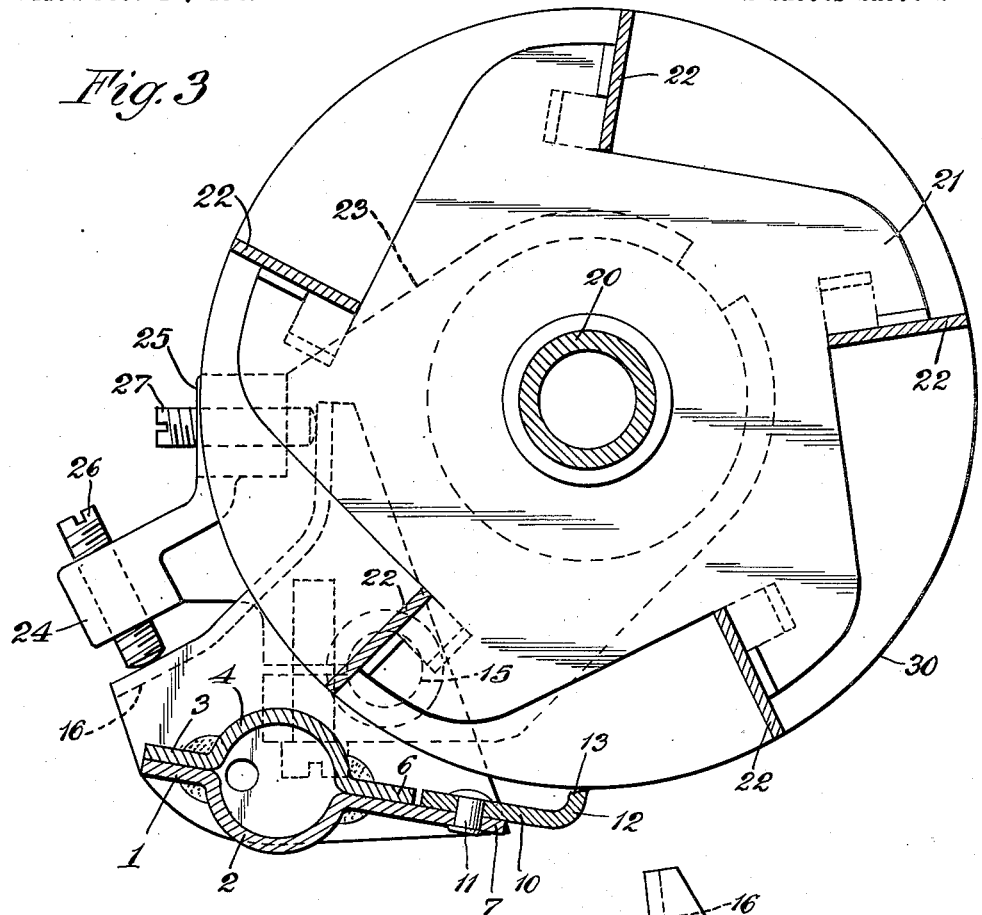
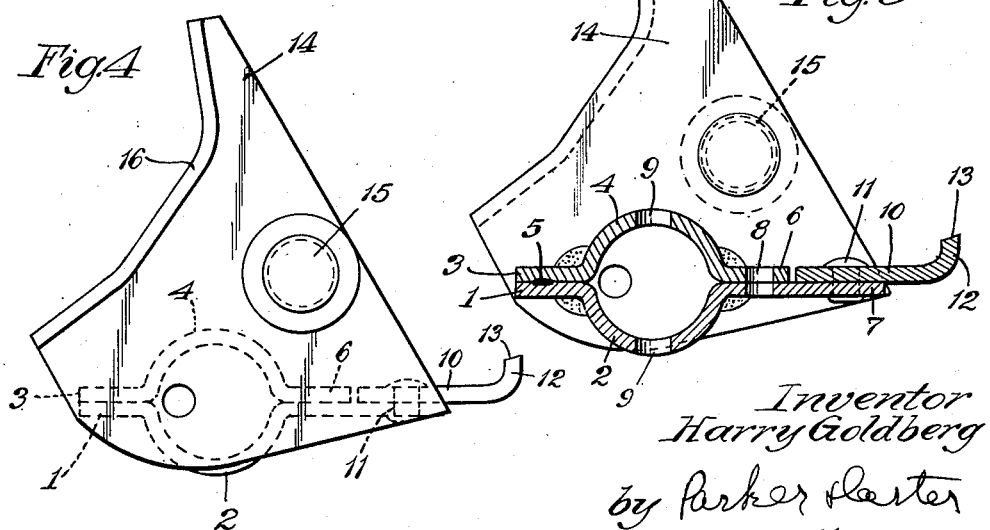
Inventor
Harry Goldberg
by Parker Carter
Attorneys Patented Aug. 8, 1950

2,518,136

UNITED STATES PATENT OFFICE 2,518,136

CUTTER BAR FOR LAWN MOWERS
AND THE LIKE

Harry Goldberg, Chicago, Ill., assignor to Pioneer Gen-E-Motor Corporation, Chicago, Ill., a corporation of Delaware Application December 13, 1947, Serial No. 791,549

6 Claims. (Cl. 56—289)

This invention relates to an improvement in cutter bars such as are used, for example, with lawn mowers.

One purpose is to provide a cutter bar of maximum strength.

Another purpose is to provide a cutter bar of maximum strength and lightness.

Another purpose is to simplify and economize the manufacture of such cutter bars.

Another purpose is to provide a cutter bar which maintains a cutter edge of maximum rigidity and trueness.

Other purposes will appear from time to time in the course of the specification and claims.

The invention is illustrated more or less diagrammatically in the accompanying drawings wherein:

Fig. 1 is a plan view of the cutter bar;

Fig. 2 is a front elevation of the cutter bar;

Fig. 3 is a vertical section illustrating the cutter bar and parts of a lawn mower to which it is applied;

Fig. 4 is an end view of the cutter bar; and

Fig. 5 is a section on the line 5—5 of Fig. 1.

Like parts are indicated by like symbols throughout the specification and drawings.

Referring to the drawings, 1 generally indicates a cutter bar bottom plate, shown as having a longitudinally extending, concavo-convex rib 2, which preferably extends from end to end of the bar. 3 generally indicates an upper cutter bar having an upwardly offset rib or concavo-convex portion 4, also shown as extending from end to end of the bar. It is advantageous, although not necessary, to have the portions or ribs 2 and 4 define, together, a generally cylindrical strengthening rib extending from end to end of the cutter bar. The parts may be connected, as at 5, by welding. It will be understood that any suitable welding, such as spot-welding, may be employed.

It will be observed that the upper bar includes a side portion 6 which is substantially shorter than the side portion or flange 7 of the lower bar. For convenience in assembly and spot-welding, I may provide aligning apertures 8 and 9. Riveted, or otherwise secured, to the outwardly extending portion 7 of the lower bar 1, I illustrate a cutter blade 10, shown as connected by rivets 11. Its forward edge is upwardly curved, as at 12, and terminates in a beveled or offset cutting surface 13. At each end of the bar thus formed is an end plate 14, which is provided with an outwardly extending stud 15, and is also provided with an offset, outwardly extending flange 16. The end plates 14 may be welded, or otherwise secured, to the rest of the plate structure.

It will be understood that the above described cutter bar structure may be employed with a wide variety of mowers, and that the details of the mowers do not, of themselves, form part of the present invention.

In Fig. 3 I have illustrated, in vertical section, an assembled structure in which 20 is the hollow tubular portion of a lawn mower reel. It is provided with a plurality of spiders 21, upon which any suitable spiraled knives 22 may be secured. 23 somewhat diagrammatically indicates a supporting end plate having thickened end portions 24 and 25 in which are threaded adjusting screws 26 and 27, the ends of which abut against the flanges 16 of the cutter bar end plates. It will be understood that the cutter bar end plates are suitably pivoted or journaled in the supporting end plate 23 of the lawn mower assembly. It will be understood that the connection between the screws 26 and 27 and the flanges 16 may be employed to set the cutter bar structure in relation to the periphery or cutting path 30 of the cutter knives 22.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:

In the operation of my device, the above described cutter bar structure is journaled in any suitable lawn mower side plates or end members 23, which may also serve to carry or support the cutter reel itself. The cutting edge 13 of the blade 12 may be adjusted in relation to the cutting path 30 of the knives 22 by proper setting of the screws 26 and 27. The result is an accurate and easily supported cutter with a blade portion which is true and rectilinear, and which is properly related to the axis passing through the studs 15. The screw structure shown permits a very accurate but easy and quick adjustment of the cutter bar blade toward and away from the path of the cutting edges of the knives 22 on the reel.

I claim:

1. In a cutter bar for lawn mowers and the like, a formed steel cutter bar having a body of sheet metal, said body including an upper and a lower sheet metal element extending continuously substantially from end to end thereof, each said element having concavo-convex reinforcing ribs, spaced inwardly from the edges of the bar, and extending from end to end of the bar.

2. The structure of claim 1, characterized by and including concavo-convex reinforcing ribs which, together, define substantially a cylinder.

3. The structure of claim 1, characterized by and including end plates secured to the ends of said cutter bar.

4. The structure of claim 1, characterized by and including end plates welded to the ends of said cutter bar.

5. The structure of claim 1, characterized by and including end plates for the cutter bar, each of which has a pivot member outwardly extending therefrom.

6. The structure of claim 1, characterized by and including end plates for the cutter bar, each of which has a flange extending therefrom and adapted to receive adjusting members.

HARRY GOLDBERG.

REFERENCES CITED

The following references are of record in the file of this patent:

UNITED STATES PATENTS

| Number | Name | Date |
|---|---|---|
| 255,688 | Spottswood | Mar. 28, 1882 |
| 817,157 | Coldwell | Apr. 10, 1906 |